UNITED STATES PATENT OFFICE.

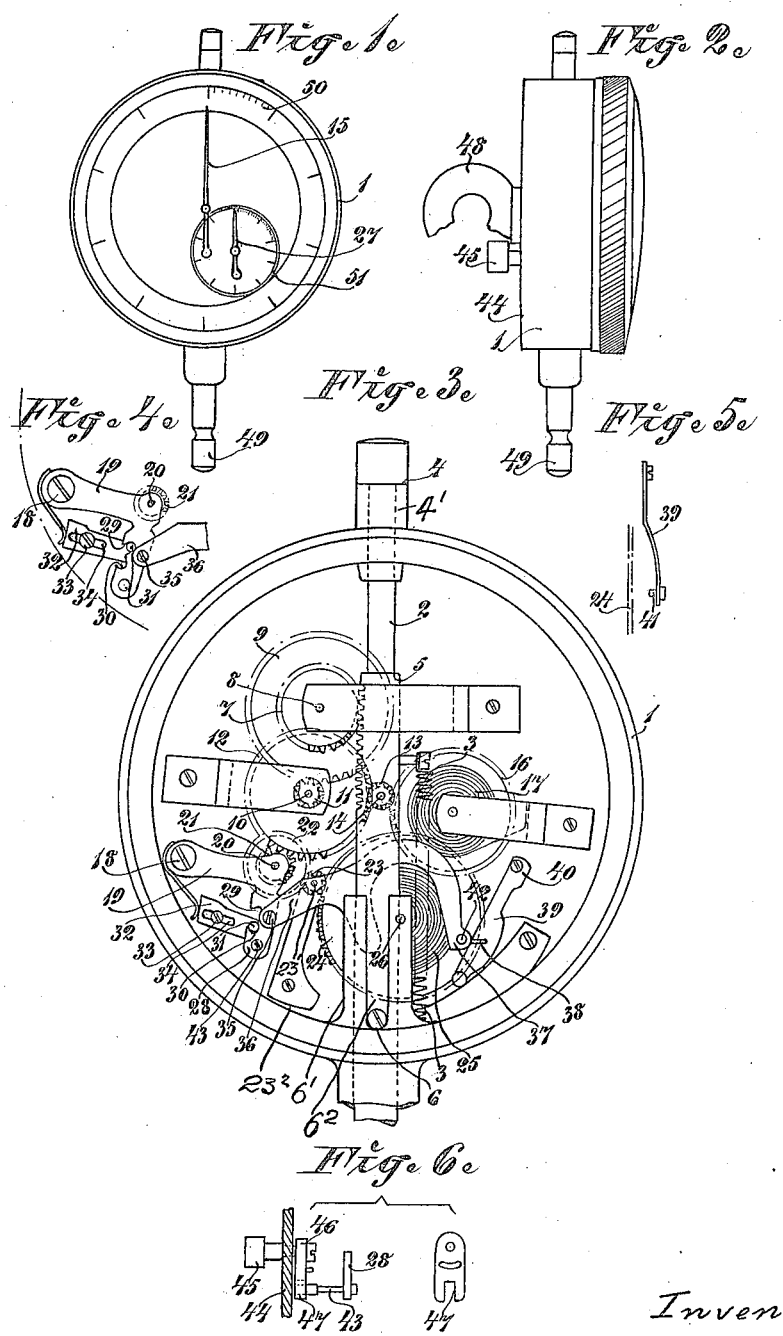

HERMAN SAMUEL, OF STOCKHOLM, SWEDEN.

MEASURING INSTRUMENT.

1,386,899.  Specification of Letters Patent.  Patented Aug. 9, 1921.

Application filed December 4, 1919. Serial No. 342,572.

*To all whom it may concern:*

Be it known that I, HERMAN SAMUEL, a subject of the King of Sweden, and resident of Stockholm, Sweden, have invented certain new and useful Improvements in Measuring Instruments, for which I have filed application in Sweden, December 2, 1918, No. 4550, and of which the following is a specification.

In the instruments now in use for measuring, for instance, the displacement or deflection of a rotating object, and which consists of a spring-actuated, toothed rack sliding in a casing and acting through the intermediary of gearing to operate a pointer which indicates the extent of such displacement, it has generally been sufficient to determine the measurement in terms of hundredths of a millimeter.

In many cases, however, it may be necessary to determine the measurement more precisely, for instance in terms of thousandths of a millimeter; and to effect this, the indicating mechanism according to the present invention comprises an additional pointer, indicating the extent of displacement in terms of the last unit mentioned.

To prevent the mechanism for operating this second pointer from being subjected to unnecessary wear, it is designed to be engaged and disengaged, so that it is active only when a particular precision is required but is normally inactive.

The engaging and disengaging device consists according to the invention of a lever mounted to oscillate about one end and carrying at its other end a gear which, by the rocking of the lever, is brought into or out of mesh with one of the gears which are indirectly acted upon by the rack, the latter gear transmitting the movement of the rack to a pointer-operating gear controlled by a balancing or re-setting spring. The pointer indicates the extent of the deflection on a scale in thousandths of a millimeter.

The rocking lever comprises an extension or arm provided with two recesses adapted to alternatively receive a pin fixed to a movable, spring-actuated plate, the lever being in this way locked in gear-engaged or disengaged position.

Fixed to the lever arm or extension is another lever, which, when the first lever is disengaged, acts upon a brake device for the gear which controls the thousandths pointer. This gear is securely held against rotation by a brake device when not in use, and is thus prevented from being put into motion unnecessarily, which would have a detrimental effect upon the precision of the instrument.

The brake device consists of a flat spring fixed to the casing, which spring is pressed against the controlling gear and brakes it, when the second-named lever is rocked in one direction, but releases said gear when the return movement of the lever takes place, the latter movement occurring when the device is in active or engaged position, so that the gear in question will then be free to rotate and operate its pointer.

The lever acting upon the brake device at the same time forms a guide for the balance spring which is located under it, and prevents the different coils of the spring from becoming superposed at the contraction of the spring, the outer end of which latter, moreover, is fixed to said lever.

The engaging and disengaging device may be operated from the outside of the apparatus by means of a thumb screw or the like, which passes through the cover and to the inner end of which is fixed a forked lever acting upon a pin or the like fixed to the disengaging device.

An embodiment of the invention is illustrated in the accompanying drawing, in which:

Figures 1 and 2 are front and side views, respectively, of the improved instrument;

Fig. 3 is a rear view on an enlarged scale, with the back of the casing omitted;

Fig. 4 is a detail view of the disengaging device;

Fig. 5 shows the brake device in side view; and

Fig. 6 shows the arrangement for adjusting the engaging and disengaging device from outside of the casing.

The apparatus consists of a casing 1, within which a toothed rack 2 is slidably mounted and acted upon by a spiral spring 3 which tends to displace it longitudinally in the casing. The latter is provided at a point in line with the rack with a sleeve 4' which has its inner and outer portions disposed, respectively, within and without the casing, and through which the stem of the rack slidably extends. This sleeve 4' acts as a stop to limit the movements of the rack in opposite directions, for which purpose the rack stem is provided at its outer end with an enlargement or shoulder 4 which is adapted to contact with the outer portion of the stop sleeve, and said rack is further provided at the point where its stem and toothed parts join, with a second stop or shoulder 5 adapted to contact with the inner portion of the stop sleeve. In addition to the stop parts 4 and 5, the rack also carries a pin 6, which slides in the bifurcation or slot 6² formed in a bracket 6' fixed in the casing, said pin reaching the inner end or bottom of the slot 6² at the same time that stop 4 hits against the outer end of sleeve 4', so that it, likewise, acts to a certain extent as a stop; the main function of the pin, however, being to guide the rack in its movement and prevent it from turning. The motion of the rack 2 is transmitted to a gear 7 fixed to the shaft 8 which also carries a second gear 9, the latter transmitting the motion to a pair of gears 11 and 12 fixed to a shaft 10. Gear 12 meshes with and drives a gear 13 fixed to the shaft 14, to which the pointer 15 for the hundredths scale is also fixed; and said gear 13, in turn, meshes with the gear 16, which together with the spiral spring 17 serves to return the pointer 15 to zero position.

On a screw 18 fixed to the casing 1 there is pivotally mounted a lever 19, carrying two gears 21, 22 fixed to each other and arranged on a shaft 20. The gear 21 may, by displacing the lever 19, be brought into or out of mesh with the gear 12, while the gear 22 meshes with and drives a gear 23 which is mounted on a pin or shaft 23' carried by a bracket 23² fixed to the casing, said gear 23 transmitting its motion to a gear 24, whose shaft 26 carries the pointer 27 for the thousandths scale. Gear 24 has associated with it a coil spring 25 for resetting said pointer.

The lever 19 is formed at its free end with an angularly disposed extension or arm 28 provided with two recesses 29 and 30 adapted to alternatively receive a pin 31 fixed to a spring-actuated plate 32, said plate being slidably mounted on a screw 33, which is fixed to the casing 1 and projects through a guide slot 34 formed in the plate. When pin 31 is engaged in the recess 30, the position of the parts is such that gear 21 is in mesh with gear 12, and such position will be maintained by means of the coaction between said pin and recess; but when the pin is engaged in the recess 29, then the gears 21 and 12 will be out of mesh, displacement of the parts being prevented, as before, by the reception of the pin in said recess 29. The lever 19 is shifted from outside the casing from either of its two positions to the other by means of a thumb screw 45, in the manner subsequently explained.

Rigidly fixed to the lever arm 28 by means of a screw 35 or in any other suitable manner, is a fork-shaped arm 36 which, by reason of such attachment, is caused to move in one direction or the other with said arm 28, one branch 37 of arm 36 carrying a pin 38 adapted to move over the bowed portion of a leaf spring 39 (Fig. 5) and thereby depress said portion. The spring 39 has one end 40 fixed to the casing 1, and at its other end it carries a stop pin or brake 41, which is disposed opposite the teeth of the gear 24 and in spaced relation thereto but which, in the pressed-down position of the spring 39, engages in the adjacent tooth-space of the gear 24 and holds it against rotation. The fork-shaped arm 36 has connected to the free end of its branch 37 at 42 the outer end of the spring 25, said arm overlying the spring and thus forming a guard for the same which prevents the coils thereof from becoming superposed during the contraction of the spring.

To effect the previously-mentioned shifting of lever 19 in order to engage and disengage the gear 21, there is fixed to the end of the lever arm 28 a pin 43 acted on from the outside by means of the thumb-screw 45 above referred to, said screw being rotatably mounted in the cover 44. This screw 45 carries at its inner end a plate 46 (Fig. 6), the outer end of which has a bifurcation 47 to receive said pin, so that by turning screw 45 in one direction or the other, the lever 28—29 is rocked to one side or the other, carrying the gear 21 with it.

In use, the apparatus is attached to a suitable frame or support by means of the eyelet 48, and the end 49 of the rack 2 is brought to rest against the object whose oscillations or whose deviations from the spherical shape are to be determined. The rack 2 is thereupon operated, and by means of the gear train formed by the gears 7, 9, 11, 12 and 13 the pointer 15 is caused to indicate upon the hundredths scale 50 the amount of the deflection in hundredths of a millimeter, in which case if the gear train for operating the thousandths pointer 27 has been completed by turning the screw 45, the amount of the deflection will be indicated by said pointer in thousandths of a millimeter on the scale 51.

It is obvious that the apparatus illustrated should only be considered as one embodiment of the invention and that the invention may be varied in many respects without departing from the principles upon which it is based.

I claim as my invention:—

1. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; and a movable coupling for alternatively connecting the second train to, or disconnecting it from, the first train.

2. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a rocking lever movable between the first and second trains; and gearing carried by said lever to move therewith alternatively into and out of engagement with said trains and thereby complete or interrupt the driving connection from the first train to the second.

3. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a movable coupling for alternatively connecting the second train to, or disconnecting it from, the first train; a casing wherein all of the above parts are inclosed; and means projecting into the interior of the casing and operatively related to said coupling to actuate the same from the exterior of the casing.

4. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a movable coupling for alternatively connecting the second train to, or disconnecting it from, the first train; and means for yieldingly locking said coupling in either connecting or disconnecting position.

5. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a movable coupling for alternatively connecting and disconnecting the second train to and from the first train and comprising an element having a pair of recesses therein corresponding to the connecting and disconnecting positions of the coupling; and a spring-actuated locking member alternatively engageable in said recesses.

6. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a rocking lever movable between the first and second trains and having a pair of spaced recesses; gearing carried by said lever to move therewith alternatively into and out of engagement with said trains and thereby complete or interrupt the driving connection from the first train to the second; and a spring-controlled element engageable alternatively in said recesses to lock the lever in either completing or interrupting position.

7. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a rocking lever movable between the first and second trains; gearing carried by said lever to move therewith alternatively into and out of engagement with said trains and thereby complete or interrupt the driving connection from the first train to the second; a casing wherein all of the above parts are inclosed; and a member projecting through said casing into the interior thereof and operatively related to said lever to actuate the same from the exterior of the casing.

8. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; a rocking lever movable between the first and second trains; gearing carried by said lever to move therewith alternatively into and out of engagement with said trains and thereby complete or interrupt the driving connection from the first train to the second; a casing wherein all of the above parts are inclosed; a member rotatably mounted in said casing and extending into the interior thereof; a projection attached to the inner end of said member; and an operating connection between said projection and said lever.

9. In a measuring instrument, the combination, with an operating element, an indicating mechanism, and driving means for the indicating mechanism actuated by said operating element; of an auxiliary indicating mechanism; means for normally locking it against operation; driving means for the second indicating mechanism alternatively connectible to and disconnectible from the first-named driving means; and means operated automatically consequent upon the connection of the second-named driving means for unlocking the second indicating mechanism.

10. In a measuring instrument, the combination, with an operating element, an indicating mechanism, and driving means for the indicating mechanism actuated by said operating element; of an auxiliary indicating mechanism; a brake normally engaged with the second indicating mechanism to lock it against operation; driving means for the second indicating mechanism alternatively connectible to and disconnectible from the first-named driving means; and means operated automatically consequent upon the connection of the second-named driving means for disengaging said brake.

11. In a measuring instrument, the combination, with an operating element, an indicating mechanism, and driving means for the indicating mechanism actuated by said operating element; of an auxiliary indicating mechanism; a spring locking member normally engaged with the second indicating mechanism; driving means for the second indicating mechanism alternatively connectible to and disconnectible from the first-named driving means; and means operated automatically consequent upon the connection of the second-named driving means for releasing said locking spring from such engagement.

12. In a measuring instrument, the combination, with an operating element, an indicating mechanism, and driving means for the indicating mechanism actuated by said operating element; of an auxiliary indicating mechanism; driving means for the second indicating mechanism alternatively connectible to and disconnectible from the first-named driving means and including a gear; a locking member normally engaged with said gear to hold the second indicating mechanism against operation; and means operated automatically consequent upon the connection of the second-named driving means for releasing said locking member from said gear.

13. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; means for normally locking the second indicating mechanism against operation; a movable coupling for alternatively connecting the second train to, or disconnecting it from, the first train; and means operated by the connecting movement of said coupling for unlocking said second indicating mechanism.

14. In a measuring instrument, the combination, with an operating element, an indicator for registering measurements in terms of one unit, and a gear train leading from said operating element to said indicator; of an indicator for registering the measurements in terms of a different unit; a gear train leading to the second indicator; means for normally locking the second indicating mechanism against operation; a movable coupling for alternatively connecting the second train to, or disconnecting it from, the first train; and an arm secured to said coupling for automatically unlocking the second indicating mechanism during and consequent upon the connecting movement of the coupling.

15. In a measuring instrument, the combination, with an operating element, an indicating mechanism, and driving means for the indicating mechanism actuated by said operating element; of an auxiliary indicating mechanism; means for normally locking the second indicating mechanism against operation; a coupling multiple alternatively into and out of position to connect the second indicating mechanism with the driving means for the first indicating mechanism to be driven therefrom, said coupling including a rocking lever; and an arm secured to said lever for automatically unlocking the second indicating mechanism during and consequent upon the movement of the coupling into connecting position.

16. In a measuring instrument, the combination, with an operating element, an indicating mechanism, and driving means for the indicating mechanism actuated by said operating element; of an auxiliary indicating mechanism; a coupling movable between the second indicating mechanism and the driving means for the first indicating mechanism into and out of position to alternatively connect the two; means for normally locking the second indicating mechanism against operation; connecting means between said coupling and said locking means for automatically releasing the latter during and consequent upon the movement of the coupling into connecting position; and re-setting means for the second indicating mechanism including a spiral spring having its free outer end connected with said connecting means, whereby said connecting means serves to prevent superposition of the coils of said spring during the contraction of the spring.

17. In a measuring instrument, the combination, with an operating element, an indicating mechanism, and driving means for the indicating mechanism actuated by said operating element; of an auxiliary indicating mechanism; driving means for the second indicating mechanism alternatively connectible to and disconnectible from the first-named driving means and including a gear, a spring locking member having a pin normally engaged with said gear to hold the second indicating mechanism against operation; and means operated automatically consequent upon the connection of the second-named driving means for releasing said pin from said gear.

In testimony whereof I have hereunto set my hand in presence of two subscribing witnesses.

HERMAN SAMUEL.

Witnesses:
 Öke Reidber,
 Arthur Signeul.